United States Patent
Liang

(10) Patent No.: US 7,308,553 B2
(45) Date of Patent: Dec. 11, 2007

(54) PROCESSOR DEVICE CAPABLE OF CROSS-BOUNDARY ALIGNMENT OF PLURAL REGISTER DATA AND THE METHOD THEREOF

(75) Inventor: Bor-Sung Liang, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 418 days.

(21) Appl. No.: 10/987,150

(22) Filed: Nov. 15, 2004

(65) Prior Publication Data

US 2005/0114631 A1 May 26, 2005

(30) Foreign Application Priority Data

Nov. 26, 2003 (TW) ............... 92133204 A

(51) Int. Cl.
*G06F 12/04* (2006.01)
(52) U.S. Cl. ............... 711/214; 711/154
(58) Field of Classification Search ........... 711/117, 711/154, 214; 710/22; 708/209
See application file for complete search history.

(56) References Cited

U.S. PATENT DOCUMENTS

| | | | | |
|---|---|---|---|---|
| 4,814,976 A | * | 3/1989 | Hansen et al. | 711/201 |
| 5,168,561 A | * | 12/1992 | Vo | 710/22 |
| 5,295,250 A | * | 3/1994 | Komoto et al. | 708/209 |
| 5,386,531 A | * | 1/1995 | Blaner et al. | 711/201 |
| 5,740,398 A | * | 4/1998 | Quattromani et al. | 711/117 |
| 6,721,866 B2 | * | 4/2004 | Roussel et al. | 711/201 |
| 7,051,168 B2 | * | 5/2006 | Gschwind et al. | 711/154 |
| 2006/0010304 A1 | * | 1/2006 | Homewood et al. | 711/201 |

* cited by examiner

*Primary Examiner*—Matthew Kim
*Assistant Examiner*—Paul Schlie
(74) *Attorney, Agent, or Firm*—Bacon & Thomas, PLLC

(57) ABSTRACT

A processor device capable of cross-boundary alignment of plural register data and the method thereof. The processor includes a decoder to decode a multiple shift instruction, a register unit with plural N-bit registers, a shifter to combine a first and a second output contents of the register unit to form a 2N-bit word and shift the word by w bits, thereby outputting first N bits of the word shifted, a controller to set the register unit in accordance with the multiple shift instruction decoded, thereby reading contents of corresponding registers for shifting w bits by the shifter and then writing an output of the shifter to the register unit.

13 Claims, 7 Drawing Sheets

|  | 100h | 101h | 102h | 103h |
|---|---|---|---|---|
| 100h | Z | A | B | C |
| 104h | D | E | F | G |
| 108h | H | I | J | K |
| 10Ch | L | Z | Z | Z |

FIG. 1

```
LW R16, (100)h          //[R16] = ZABCh
SLL R16, R16, 8         //Shift Left Logical 8 bits, [R16] = ABC0h
LW R17, (104)h          //[R17] = DEFGh
SRL R17, R17, 24        // Shift Right Logical 24 bits, [R17] = 000Dh
OR R16, R16, R17        // Load ABCD into R16, [R16] = ABCDh
LW R17, (104)h          //[R17] = DEFGh
SLL R17, R17, 8         // Shift Left Logical 8 bits, [R17] = EFG0h
LW R18, (108)h          //[R18] = HIJKh
SRL R18, R18, 24        // Shift Right Logical 24 bits, [R18] = 000Hh
OR R17, R17, R18        // Load EFGH into R17, [R17] = EFGHh
LW R18, (108)h          //[R18] = HIJKh
SLL R18, R18, 8         // Shift Left Logical 8 bits, [R18] = IJK0h
LW R19, (10C)h          //[R19] = LZZZh
SRL R19, R19, 24        // Shift Right Logical 24 bits, [R19] = 000Lh
OR R18, R18, R19        // Load IJKL into R18, [R18] = IJKLh
```

FIG. 2

```
LWL R16, (100+1)h    //[R16] = ABCXh, X is don't care
LWR R16, (100+4)h    //[R16] = ABCDh
LWL R17, (104+1)h    //[R17] = EFGXh
LWR R17, (104+4)h    //[R16] = EFGHh
LWL R18, (108+1)h    //[R16] = IJKXh
LWR R18, (108+4)h    //[R16] = IJKLh
```

|      | 100h | 101h | 102h | 103h |
|------|------|------|------|------|
| 100h | Z    | A    | B    | C    |
| 104h | D    | E    | F    | G    |
| 108h | H    | I    | J    | K    |
| 10Ch | L    | Z    | Z    | Z    |

LW R16, (100)h
LW R17, (104)h
LW R18, (108)h
LW R19, (10C)h
MLSI R16, R19, 8

FIG. 7

PROCESSOR DEVICE CAPABLE OF CROSS-BOUNDARY ALIGNMENT OF PLURAL REGISTER DATA AND THE METHOD THEREOF

BACKGROUND OF THE INVENTION

1. Field of the Invention

The present invention relates to the technical field of data processing and, more particularly, to a processor device capable of cross-boundary alignment of plural register data and the method thereof.

2. Description of Related Art

While a processor performs data processing, data alignment may affect the performances of many key operations, such as the operations of string, array and the like. As shown in FIG. 1, data to be processed, such as 'ABCDEFGHIJKL', normally exceeds the store boundary. As such, before a processor performs any string or array operation on the data, the data must be restored to the aligned format by executing many additional operations firstly.

Upon this problem, a typical scheme is that after the data is loaded to the processor, various instructions in the processor are applied for obtaining required data. As shown in FIG. 2, partial data 'ZABC' at address 100$h$ is loaded to register R16 to shift left by eight bits and remove the letter 'Z', then partial data 'DEFG' at address 104$h$ is loaded to register R17 to shift right by 24 bits and remove letters 'EFG', and finally an OR operation is applied to registers R16 and R17 to obtain a result to be stored in register R16. At this point, the content of register R16 is a required data 'ABCD'. Accordingly, as the cited steps are repeated, partial data 'EFGH' and IJKL are loaded to registers R17 and R18.

As cited, if a required length of unaligned data to be loaded is n words (each having 32 bits), the typical scheme requires 5n instructions to describe load operation and at least 5n instruction cycles to complete the load operation, which needs large memory space for storing required program codes and also increase processor load so as to result in poor performance.

Upon this problem, U.S. Pat. No. 4,814,976 granted to Hansen, et al. for a "RISC computer with unaligned reference handling and method for the same" performs the alignment as loading unaligned data and reads a data exceeding the boundary completely by two times. As shown in FIG. 3, data 'ABC' at addresses 101$h$ to 103$h$ is loaded to bytes 0, 1 and 2 of register r16. In this case, byte 3 of register 16 is X (don't care). Next, data 'D' at address 104$h$ is loaded to byte 3 of register R16. At this point, data 'ABCD' to be processed is in register R16. Accordingly, as the cited steps are repeated, data 'EFGH' and 'IJKL' are loaded to registers R17 and R18.

As cited, if a required length of unaligned data to be loaded is n words, it needs 2n instructions to describe load operation and at least 2n instruction cycles to complete the load operation. Since read and write are repeated at the same memory position and register, the processor pipeline stall can be increased and the bus bandwidth is wasted. Especially to some systems without cache, delay can be obvious.

Therefore, it is desirable to provide an improved processor device and method to mitigate and/or obviate the aforementioned problems.

SUMMARY OF THE INVENTION

The object of the present invention is to provide a processor device capable of cross-boundary alignment of plural register data and the method thereof, which can avoid the prior problem of occupying much memory by large codes and wasting bus bandwidth due to repeated reading to the same memory.

In accordance with one aspect of the present invention, there is provided a processor device capable of cross-boundary alignment of plural register data. The processor device includes a decoder, a register unit, a shifter and a controller. The decoder decodes a multiple shift instruction. The register unit inputs external data through its input terminal to one of internal N-bit registers in accordance with a third address, reads register contents in accordance with a first address and a second address respectively, and outputs the register contents read through a first and a second output terminals of the register unit, where N is a positive integer. The shifter combines the register contents outputted by the first and the second output terminals of the register unit to form a 2N-bit word and shifts the word by w (positive integer) bits, thereby extracting first N bits from the shifted word as the external data to output. The controller coupled between the decoder and the register unit sets the first address, the second address, the third address and the w in accordance with the multiple shift instruction decoded, to accordingly output the register contents read to the shifter for shifting w bits to form the 2N-bit word and write a part of the word from the shifter to the register unit.

In accordance with another aspect of the present invention, there is provided a method capable of cross-boundary alignment of plural register data, wherein plural N-bit registers form a register unit to read register contents in accordance with a first and a second addresses respectively, output the register contents through a first and a second output terminals of the register unit, and input an external data to one of the plural N (positive integer)-bit registers through an input terminal of the register unit in accordance with a third address. The method includes: (A) setting the first, the second and the third addresses and a value of w in accordance with a multiple shift instruction; (B) reading the register contents in accordance with the first and the second addresses respectively; and (C) combing the register contents read to form a 2N-bit word and shift it by w bits, and writing first N bits of the word shifted to one of the plural registers in accordance with the third address.

Other objects, advantages, and novel features of the invention will become more apparent from the following detailed description when taken in conjunction with the accompanying drawings.

BRIEF DESCRIPTION OF THE DRAWINGS

FIG. 1 is a schematic view illustrating typical memory arrangement of an unaligned data;

FIG. 2 is a schematic view illustrating conventional program codes for loading an unaligned data;

FIG. 7 shows an example of the invention.

DETAILED DESCRIPTION OF THE PREFERRED EMBODIMENT

Figure 3:
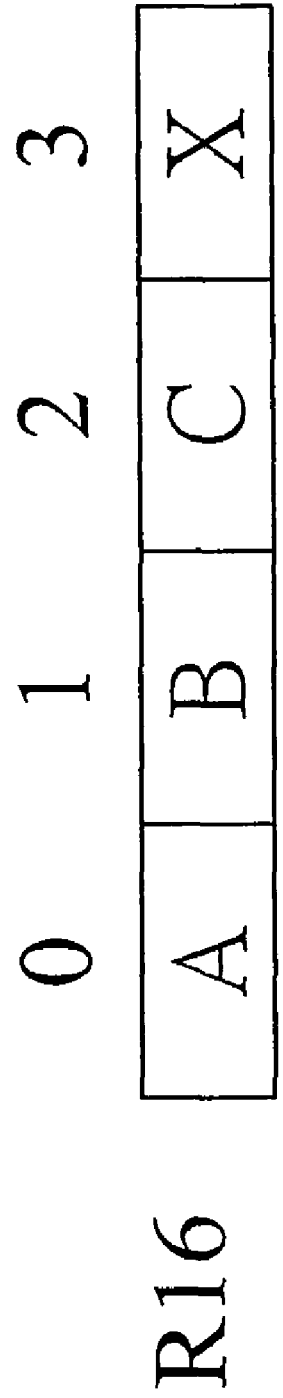
FIG. 3 is a schematic view illustrating another conventional program codes for loading an unaligned data to a register.
Figure 4:
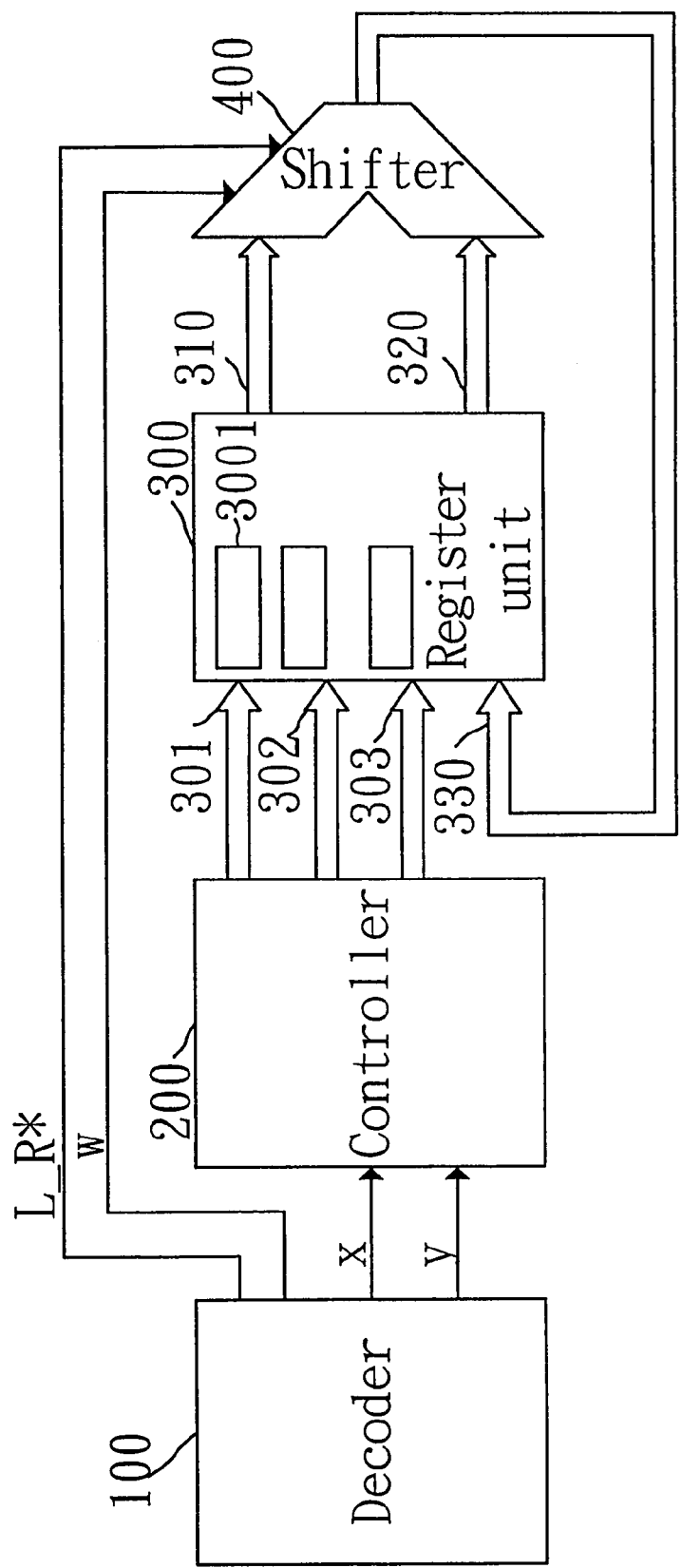
FIG. 4 is a block diagram of a processor device capable of cross-boundary alignment of plural register data in accordance with the invention.

FIG. 4 is a block diagram of a processor device capable of cross-boundary alignment of plural register data in accordance with the invention. As shown, the processor includes a decoder 100, a controller 200, a register unit 300 and a shifter 400. The register unit 300 has plural registers 3001, and each register 3001 has N bits, where N is a positive integer. In this embodiment, N is preferred to be 32. The register unit 300 reads contents of registers 3001 in accordance with a first address 301 and a second address 302 and outputs the contents read through a first output terminal 310 and a second output terminal 320 respectively for further shift by the shifter 400. Also, the register unit 300 writes data output by the shifter 400 through a third address 303 to one of the registers 3001 in accordance with a third address 303.

The decoder 100 decodes a multiple shift instruction. The multiple shift instruction includes a Multiple Left Shift Instruction (MLSI) and a Multiple Right Shift Instruction (MRSI). The MLSI has a format of MLSI Rx, Ry, w, to indicate that the contents of registers x to y are concatenated and shifted left by w bits. The MRSI has a format of MRSI Rx, Ry, w, to indicate that the contents of registers x to y are concatenated and shifted right by w bits. The decoder 100 decodes a multiple shift instruction to produce x, y, L_R* and w signals for output to the controller 200, where L_R* indicates shift left or right by w-bit. Shift left by w-bit is operated as L_R* signal equals to '1', and shift right by w-bit is operated as L_R* signal equals to '0'.

The shifter 400 is coupled to first and second outputs 300 and 310 of the register unit 300 for combining their output contents into a 64-bit word and further shifting the 64-bit word left or right by w (positive integer) bits in accordance with a value of w and an L_R* signal, thereby outputting first 32 bits of the 64-bit shifted word.

The controller 200 is coupled between the decoder 100 and the register unit 300 for setting w, and first, second and third addresses 301-303 in accordance with x, y, L_R* and w signals decoded and obtaining contents of x-th and y-th registers from first and second output terminals 310 and 320 of the register unit 300.

Figure 5:
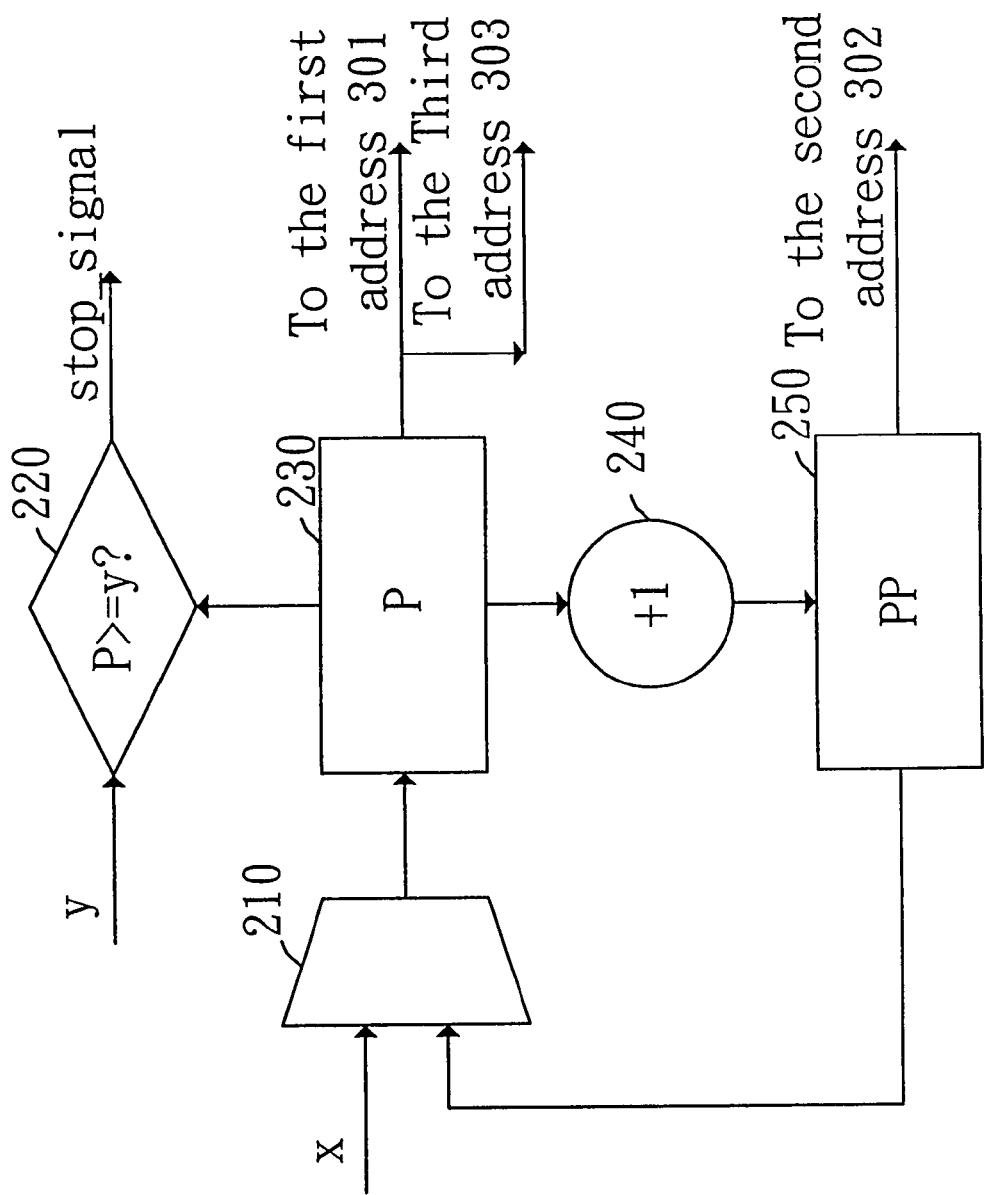
FIG. 5 is a block diagram of an interior of a controller in accordance with the invention.

FIG. 5 is a block diagram of an interior of the controller 200. As shown, the controller 200 comprises a multiplexer 210, a comparator 220, a first address register 230, an adder 240 and a second address register 250. As shown, the multiplexer 210 selects a x signal produced by the decoder 100 or a content of the second address register 250 and outputs the selected one to the first address register 230. The output of the first address register 230 is connected to the register unit 300 via the first address 301, thereby accessing one of the registers 3001 that is indicated by the first address 301. The adder 240 increases the content of the first register 230 by one and writes the increased content to the second address register 250 to access one of the registers 3001 pointed by the second address 302. The comparator 220 compares the content of the first address register 230 with y signal produced by the decoder 100. A stop signal 'stop_signal' is produced when the content of the first address register 230 is greater than or equal to the y signal.

Figure 6:
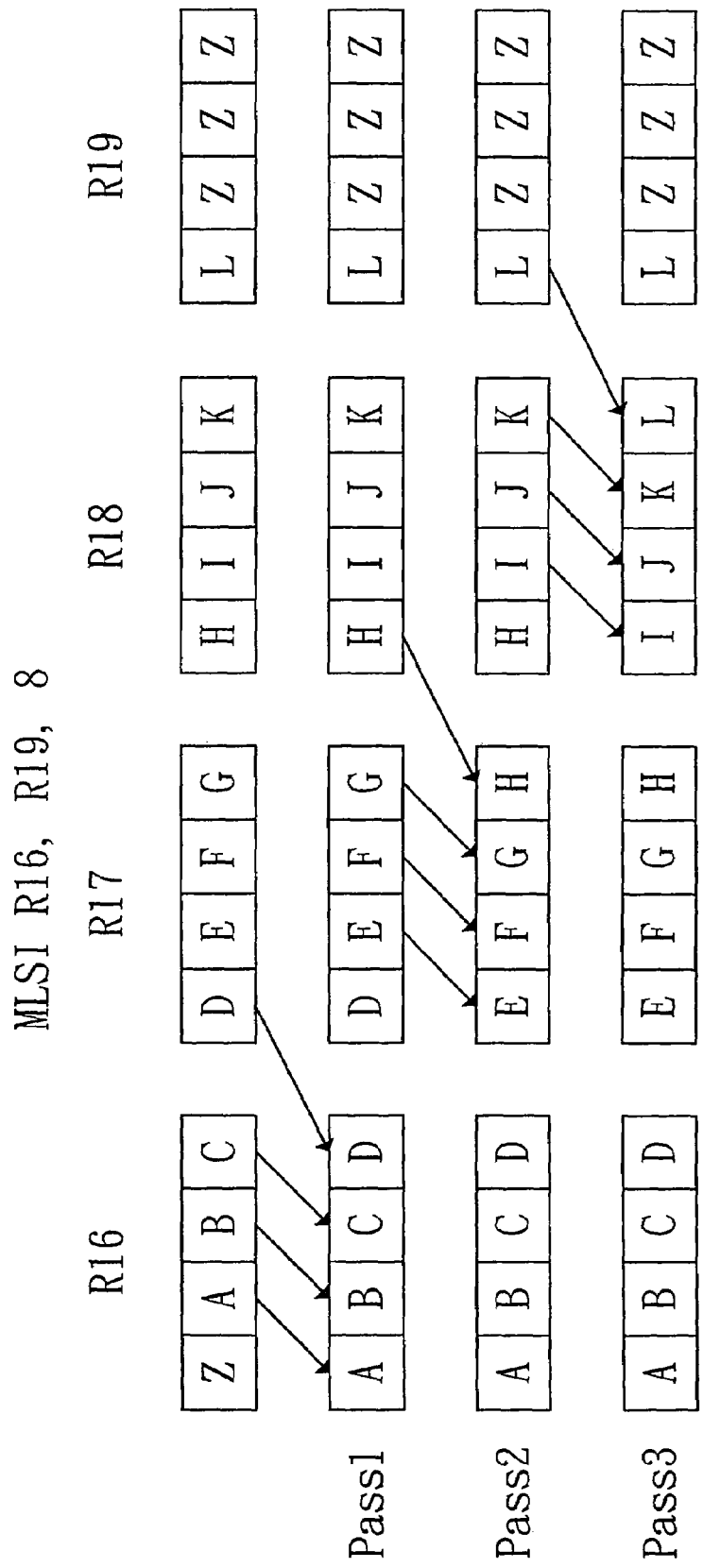
FIG. 6 schematically illustrates the operation in accordance with the invention.

FIG. 6 shows an operation of the invention, which executes an instruction MLSI R16, R19, 8. As shown, the instruction indicates to shift contents of registers R16 to R19 left together by 8 bits. When the first duty cycle for the instruction execution starts, the decoder 100 decodes the instruction to produce x=16, y=19, L_R*=1 and w=8. The multiplexer 210 selects the x signal (=16) produced by the decoder 100. The controller 200 fills in the first address register 230 with 16 and in the second address register 240 with 17 that is calculated by the adder 240. At this point, the comparator 220 does not produce the signal 'stop_signal' because the value 16 is smaller than 19. Namely, the register unit 300 can read contents ('ZABC' and 'DEFG') of the registers R16 and R17 and output the contents through the first and the second output terminals 310 and 320 respectively to the shifter 400.

The shifter 400 combines the contents as a 64-bit word ('ZABCDEFG') and shifts the 64-bit word left by 8 bits in accordance with w=8 and L_R*=1 to thus output first 32 bits ('ABCD') of the shifted word ('ABCDEFG0'). The controller 200 writes the output ('ABCD') of the shifter 400 to the register R16 in accordance with the third address 303 (=16).

Similarly, when the second duty cycle starts, the multiplexer 210 selects the content (17) of the second address register 250. The controller 200 fills in the first address register 230 with 17 and in the second address register 250 with 18 that is calculated by the adder 240. As the second duty cycle ends, the register R17 has a content 'EFGH', and similarly, the register R18 has a content 'IJKL' as the third duty cycle ends.

When the fourth duty cycle starts, the multiplexer 210 selects the content (19) of the second address register 250. The controller 200 fills in the first address register 230 with 19, which cause the comparator 220 to produce the signal 'stop_signal' to terminate the procedure. Therefore, only three duty cycles are required.

FIG. 7 shows an example of the invention. As shown, for loading an unaligned data, the unaligned data is loaded by a load instruction LW to registers R16 to R19 to further shift by the instruction MLSI, and thus loading the unaligned data is complete. As such, only five-word codes are required.

As cited, it is obvious that the invention can reduce code size and memory space. In addition, the invention can avoid repeated read/write to the same memory and save bus bandwidth.

Although the present invention has been explained in relation to its preferred embodiment, it is to be understood that many other possible modifications and variations can be made without departing from the spirit and scope of the invention as hereinafter claimed.

What is claimed is:

1. A processor device capable of cross-boundary alignment of plural register data, comprising:
    a decoder, which decodes a multiple shift instruction;
    a register unit consisting of a plurality of N-bit registers, which inputs external data through its input terminal to one of the N-bit registers in accordance with a third address, reads register contents in accordance with a first address and a second address respectively, and outputs the register contents read through a first and a second output terminals of the register unit, where N is a positive integer;
    a shifter connected to the first and the second output terminals of the register unit, which combines the register contents outputted by the first and the second output terminals of the register unit to form a 2N-bit word and shifts the 2N-bit word by w (positive integer) bits, thereby extracting first N bits from the shifted word as the external data to output; and
    a controller coupled between the decoder and the register unit, which sets the first address, the second address, the third address and the w value in accordance with the decoded multiple shift instruction, to accordingly output the register contents read by the register unit to the shifter for shifting w bits and write the external data as an output of the shifter to the register unit.

2. The processor device as claimed in claim 1, wherein N equals to 32.

3. The processor device as claimed in claim 1, wherein w equals to 8, 16 or 24.

4. The processor device as claimed in claim 1, wherein the shifter performs shifting left or right by w bits.

5. The processor device as claimed in claim 1, wherein the third address is the same as the first address.

6. The processor device as claimed in claim 1, wherein the second address is an address immediately following the first address.

7. A method capable of cross-boundary alignment of plural register data, wherein a plurality of N (positive integer)-bit registers form a register unit to read register contents in accordance with a first and a second addresses respectively, output the register contents through a first and a second output terminals of the register unit, and input an external data to one of the N-bit registers through an input terminal of the register unit in accordance with a third address, the method comprising the steps of:

(A) setting the first, the second and the third addresses and a value of w in accordance with a multiple shift instruction;

(B) reading the register contents in accordance with the first and the second addresses respectively; and (C) combing the register contents read to form a 2N-bit word and shift it by w bits, and writing first N bits of the word shifted to one of the registers in accordance with the third address, wherein the first N bits of the word are the external data.

8. The method as claimed in claim 7, wherein the steps (A) to (C) are repeated until a predetermined number of the registers complete shifting.

9. The method as claimed in claim 7, wherein N equals to 32.

10. The method as claimed in claim 7, wherein w equals to 8, 16 or 24.

11. The method as claimed in claim 7, wherein the step (C) performs shifting left or right by w bits.

12. The method as claimed in claim 7, wherein the third address is the same as the first address.

13. The method as claimed in claim 7, wherein the second address is an address immediately following the first address.

* * * * *